(No Model.)
W. S. JOHNSON.
ELECTRO MAGNETIC INDICATOR.
No. 299,552. Patented June 3, 1884.
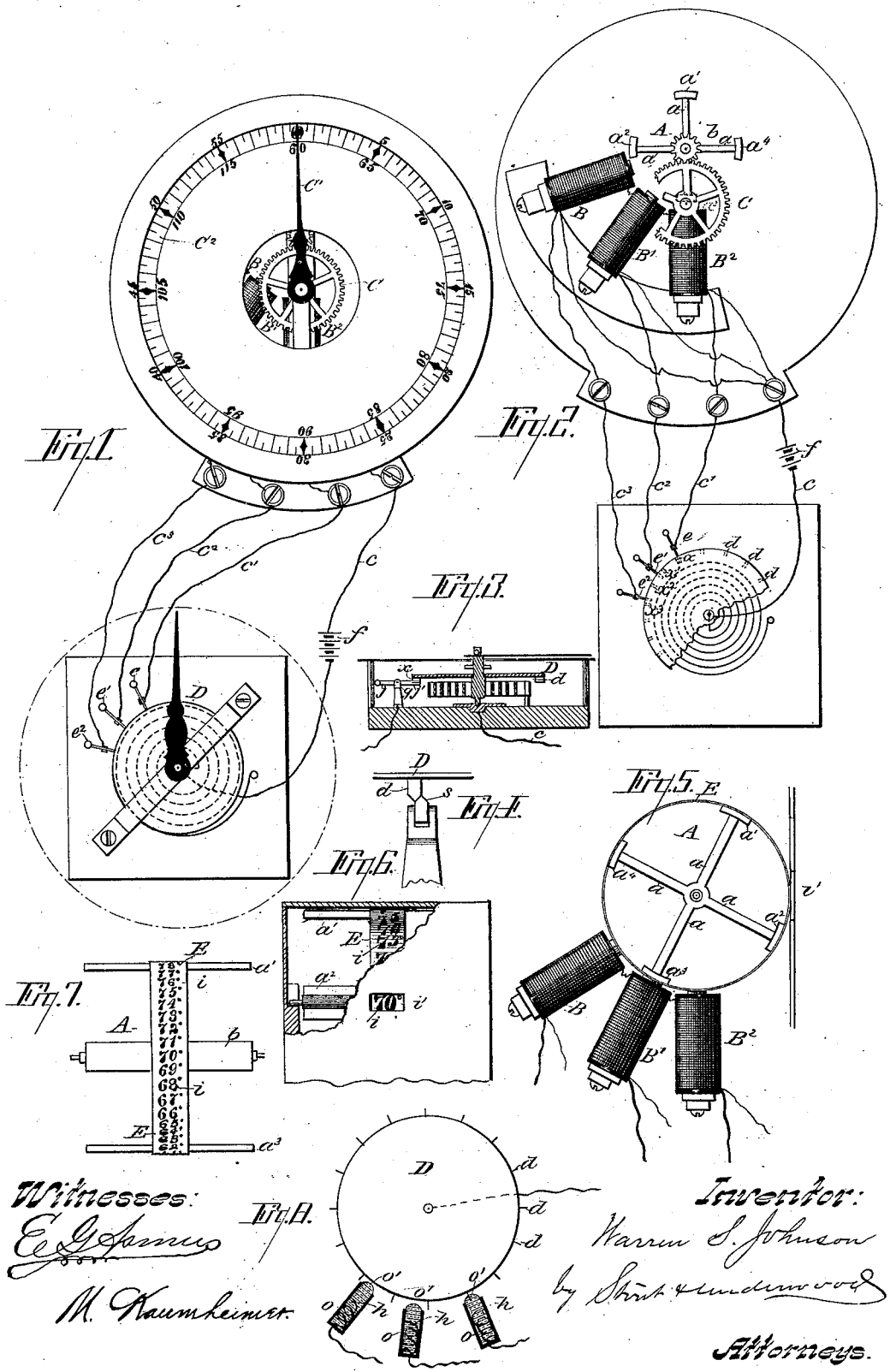

United States Patent Office.

WARREN SEYMOUR JOHNSON, OF WHITEWATER, ASSIGNOR OF ONE-HALF TO WILLIAM PLANKINTON, OF MILWAUKEE, WISCONSIN.

ELECTRO-MAGNETIC INDICATOR.

SPECIFICATION forming part of Letters Patent No. 299,552, dated June 3, 1884.

Application filed October 10, 1883. (No model.)

*To all whom it may concern:*

Be it known that I, WARREN S. JOHNSON, of Whitewater, in the county of Walworth, and in the State of Wisconsin, have invented certain new and useful Improvements in Electro-Magnetic Indicators; and I do hereby declare that the following is a full, clear, and exact description thereof.

My invention relates to electro-magnetic indicators for thermometers, pressure-gages, &c., and will be fully described hereinafter.

In the drawings, Figure 1 is a front view of my indicator connected with a metallic thermometer. Fig. 2 is also a front view of same without its dial. Figs. 3, 4, 5, 6, 7, and 8 show details and modifications of same.

A is the armature-wheel of the indicator, consisting of shaft $b$, journaled in frame $b'$, and of the four arms $a\ a\ a\ a$, on the end of which are fastened the armatures $a'$, $a^2$, $a^3$, and $a^4$. Said wheel A may be provided with an index-hand, or may be geared to a wheel, C, bearing a hand, C', pointing to the figures of the dial $C^2$, as in Fig. 1, or it may carry on its circumference a light band, E, with figures $i\ i\ i$, readable through an opening, $i'$, as shown in Figs. 5 and 6.

B, B', and B² are the electro-magnets, mounted in a suitable frame, and arranged radially to said armature-wheel A, so that their poles are close to the periphery of said wheel. These electro-magnets are in position to be electrically connected with the thermometer or pressure-gage, the variations of which it is desired to indicate at a remote distance from the point of observation. This connection is made by means of wire $c$, battery $f$, contact-wheel D, contact-pieces $e$, $e'$, and $e^2$, and return-wires $c'$, $c^2$, or $c^3$. Wire $c$ is common to the three electro-magnets B, B', and B², connecting them through battery $f$ to the shaft of contact-wheel D. Said wheel D, attached in any suitable manner to the thermometer or pressure-gage, &c., is made of conducting material, and has contact-points $d\ d\ d$, distributed around its circumference to correspond with certain divisions of said thermometer or pressure-gage, &c., and with those of the indicator-dial. The contact-pieces $e$, $e'$, and $e^2$, set in an arc corresponding to the curvature of said wheel D, are insulated from each other, and are connected to the electro-magnets B, B', and B² through their respective wires $c'$, $c^2$, and $c^3$. As said wheel D moves around in one direction or the other, its contact-points $d\ d\ d$ are successively brought in contact with said contact-pieces $e$, $e'$, and $e^2$, and thereby are the changes in temperature or pressure transmitted to the indicator-dial.

The operation is fully illustrated in Fig. 2 of the drawings, in which the electrical circuit is shown completed between the electro-magnet B² and the contact-wheel D by the contact of its point $x$ with contact-piece $e$, the armature $a^3$ standing before said electro-magnet B². Should the wheel D now move to the left, the circuit will be broken between $e$ and $x$, but it will be completed between $e'$ and $x'$. Consequently, the electro-magnet B² will be out of circuit, while B' will have come in the circuit, and the armature $a^3$ will be attracted and will take its position before said electro-magnet B', moving the indicator-hand correspondingly. On the other hand, should the contact-wheel D move in the opposite direction, the circuit will be completed through contact-piece $e^2$ and contact-point $x^3$, and the electro-magnet B, instead of B', will be brought into the circuit. The armature $a^2$ being within one space of the poles of electro-magnet B, while the armature $a^3$ is within two spaces of these poles, said armature $a^2$ will take its position before the poles of B, as the attractive influence is four times as great upon $a^2$ as upon $a^3$. It will be seen from this that in whichever direction or however far the contact-wheel D moves, the armature-wheel A will follow the same movements and show them correspondingly on the indicator-dial. The movements imparted to said contact-wheel D by the thermometer or pressure-gage to which it is connected are very delicate, and to transmit them without appreciable retardation, I provide two methods of contact between the contact-points $x\ x'\ x^2\ x^3$, $d\ d'\ d^2$, &c., and the contact-pieces $e$, $e'$, and $e^2$, as the case may require. The first method is shown in Fig. 3, which is a vertical section through center of thermometer or pressure-gage, Fig. 4, showing the form of both the contact-point and contact-piece. Said contact-pieces $e$, $e'$, and $e^2$, which, as above described, are rigidly fixed close to said wheel D, consist in this method of a lever, *j*, fulcrumed at *g*, and constructed so that the arm *j* overbalances in a small degree the opposite arm bearing the contact-piece *s*, which in its normal condition will be sufficiently in the path of the contact-points of wheel D to make an electrical contact with them. As the sides of said contact-piece *s* are beveled, and as it is slightly out of balance, the contact-points $x\ x'\ x^2$, &c., of said wheel D will easily press the lever *j* down and pass by without materially retarding said wheel D.

My second method is shown in Fig. 8. The contact-pieces consist in this method of short tubes *o*, about one-eighth of an inch in diameter, filled with mercury, and set in an arc corresponding to the curvature of the contact-wheel D. The contact is effected by the passage of the contact-points of said wheel D across the mercury, which projects beyond the mouth of said tubes in the form of a drop, *o'*. The mercury is connected with the wires $c'$, $c^2$, and $c^3$ by means of a fine wire, *h*, which is coiled in the tubes *o*. Said coiled wire *h* serves, moreover, to so entangle the mercury that any spilling of same will be prevented in case the instrument should be inclined at a great angle in changing its position.

Though I have described only two methods of producing contact, I do not confine myself to any particular method, as these may be varied indefinitely without departing from the spirit of my invention.

Having thus described my invention, what I claim as new, and desire to secure by Letters Patent, is—

1. The combination of a thermometer or other gage, a wheel having contact-points arranged at equal distances from each other and electrically connected, contact pieces or levers arranged in an arc contiguous to the circumference of said wheel, said contact pieces or levers electrically insulated from each other and adapted to make successive contact with the points on the wheel, suitable electric generators and conductors, and an electro-magnetic indicating device at a remote point, whereby the movements of the thermometer or other gage are reproduced, substantially as set forth.

2. A thermometer or gage and a disk or wheel operated thereby and carrying a series of contact-points, in combination with fixed contact-points, each wired to one of a series of electro-magnets that are arranged just outside of the path of an indicator-wheel having armatures on its spokes, and with a battery which serves to magnetize the core of the electro-magnet that is brought into circuit as the contact-disk is turned by its thermometer or gage to indicate the amount of heat or pressure acting on the thermometer or gage, as set forth.

3. In an electro-magnetic indicator, the combination, with a contact wheel or disk operated by a thermometer or gage, of slightly overbalanced levers having contact-points for engagement with those of the contact wheel or disk, electro-magnets arranged about the periphery of a remote armatured indicator-wheel, and a battery with suitable connections, whereby the movement of the contact wheel or disk on an arc of a circle will break connection with one of the cores, and by making connection with another cause the latter to attract the nearest armature of the indicator-wheel to it, and thus change the position of the indicator, as set forth.

4. The combination, with a thermometer or gage, of a contact-plate, D, having contact-points *d*, with other contact-points, arranged in the path of the points *d*, wires leading to electro-magnets B B' B², an armatured indicator-wheel, and a battery wired to the cores and plate D, as set forth.

5. An armatured indicator-wheel adapted for being revolved by electro-magnets, and carrying a band lettered or figured, as described, in combination with a cover having a slot for exposing one of the letters or figures at a time, as set forth.

In testimony that I claim the foregoing I have hereunto set my hand, on this 20th day of September, 1883, in the presence of two witnesses.

WARREN SEYMOUR JOHNSON.

Witnesses:
  STANLEY S. STOUT,
  M. KAUMHEIMER.